(12) United States Patent
Suzuki et al.

(10) Patent No.: US 8,615,626 B2
(45) Date of Patent: Dec. 24, 2013

(54) STORAGE DEVICE AND STORAGE SYSTEM

(75) Inventors: Kai Suzuki, Tokyo (JP); Takahiro Fukushige, Tokyo (JP); Tamaki Konno, Kanagawa (JP); Kouya Koba, Kanagawa (JP)

(73) Assignee: Sony Corporation, Tokyo (JP)

(*) Notice: Subject to any disclaimer, the term of this patent is extended or adjusted under 35 U.S.C. 154(b) by 116 days.

(21) Appl. No.: 13/027,338

(22) Filed: Feb. 15, 2011

(65) Prior Publication Data
US 2011/0208913 A1 Aug. 25, 2011

(30) Foreign Application Priority Data
Feb. 25, 2010 (JP) ................................. 2010-040460

(51) Int. Cl.
*G06F 12/00* (2006.01)

(52) U.S. Cl.
USPC .................... 711/113; 711/154; 711/E12.017

(58) Field of Classification Search
USPC ................................................. 711/113, 154
See application file for complete search history.

(56) References Cited

U.S. PATENT DOCUMENTS

| | | | |
|---|---|---|---|
| 6,101,575 A * | 8/2000 | Simms et al. | 711/117 |
| 2005/0172084 A1* | 8/2005 | Jeddeloh | 711/154 |
| 2007/0103954 A1* | 5/2007 | Ikeda | 365/51 |
| 2008/0019250 A1* | 1/2008 | Ando et al. | 369/84 |
| 2008/0288798 A1 | 11/2008 | Cooper et al. | |
| 2010/0115147 A1* | 5/2010 | Kim | 710/14 |

FOREIGN PATENT DOCUMENTS

JP 2006-221453 8/2006

* cited by examiner

*Primary Examiner* — Reginald Bragdon
*Assistant Examiner* — Aracelis Ruiz
(74) *Attorney, Agent, or Firm* — Sony Corporation

(57) ABSTRACT

Disclosed herein is a storage device including: a communication execution unit configured to be capable of controlling an operation state between a communication-enabled state in which data communication is possible and a pause state in which data communication is impossible; a buffer configured to store data transmitted and received by the communication execution unit; a memory configured to be capable of storing data; a memory controller configured to carry out data input and output between the memory and the buffer; and a communication controller configured to make the communication execution unit operate if data communication is carried out, and make the communication execution unit take a pause if data communication is not carried out. The communication controller switches the operation state of the communication execution unit between the communication-enabled state and the pause state in data communication depending on a data processing state of the buffer.

18 Claims, 14 Drawing Sheets

STORAGE DEVICE AND STORAGE SYSTEM

BACKGROUND OF THE INVENTION

1. Field of the Invention

The present invention relates to a storage device such as a memory card and a storage system.

2. Description of the Related Art

The memory card is removably loaded in electronic apparatus and can store data relating to data processing of the electronic apparatus.

For example, when being loaded in a camera, the memory card can store data of images captured by the camera, and so forth.

As the interface between such a memory card and electronic apparatus, PCI Express is available (refer to Japanese Patent Laid-Open No. 2006-221453 and U.S. Patent Application Publication No. 2008/0288798).

PCI Express is to transfer data at high speed by serial data communication and is suitable for data transfer of an image composed of a large number of pixels and a moving image.

SUMMARY OF THE INVENTION

However, in PCI Express, a clock signal of a high frequency is used in order to realize the high-speed serial data communication.

Therefore, possibly the power consumption will become higher if a serial data communication system such as PCI Express is used for the interface.

For example if PCI Express is employed for the interface with a memory card in mobile apparatus driven by a battery, possibly influence will be given to the continuous use time of the mobile apparatus and the life of the battery.

As just described, the interface of low power consumption is demanded in the storage device such as a memory card.

According to a first embodiment of the present invention, there is provided a storage device including a communication execution unit configured to be capable of controlling an operation state between a communication-enabled state in which data communication is possible and a pause state in which data communication is impossible, and a buffer configured to store data transmitted and received by the communication execution unit. The storage device further includes a memory configured to be capable of storing data, a memory controller configured to carry out data input and output between the memory and the buffer, and a communication controller configured to make the communication execution unit operate if data communication is carried out, and make the communication execution unit take a pause if data communication is not carried out. The communication controller switches the operation state of the communication execution unit between the communication-enabled state and the pause state in data communication depending on the data processing state of the buffer.

In the storage device according to the first embodiment of the present invention, the communication execution unit to carry out data communication switches between the communication-enabled state and the pause state in data communication depending on the data processing state of the buffer. The switching to the pause state reduces the power consumption of the communication execution unit in the data communication.

According to a second embodiment of the present invention, there is provided a storage system including electronic apparatus that executes data processing and a storage device that is removably loaded in the electronic apparatus and stores data relating to data processing of the electronic apparatus. The storage device includes a communication execution unit configured to be capable of controlling an operation state between a communication-enabled state in which data communication with the electronic apparatus is possible and a pause state in which data communication is impossible, and a buffer configured to store data transmitted and received by the communication execution unit to and from the electronic apparatus. The storage device further includes a memory configured to be capable of storing data, a memory controller configured to carry out data input and output between the memory and the buffer, and a communication controller configured to make the communication execution unit operate if data communication with the electronic apparatus is carried out, and make the communication execution unit take a pause if data communication is not carried out. The communication controller switches the operation state of the communication execution unit between the communication-enabled state and the pause state in data communication with the electronic apparatus depending on the data processing state of the buffer.

The embodiments of the present invention can realize an interface of low power consumption.

DETAILED DESCRIPTION OF THE PREFERRED EMBODIMENT

An embodiment of the present invention will be described below in association with the drawings. The order of the description is as follows.
1. Configurations of Memory Card and Camera Device (Host Apparatus)
2. Communication System of PCI Express
3. Power Supply Management of PCI Express
4. Power Supply Management in Period of Write Access by Host Apparatus
5. Power Supply Management in Period of Read Access by Host Apparatus

[Configurations of Memory Card 1 and Camera Device 2]

Figure 1:
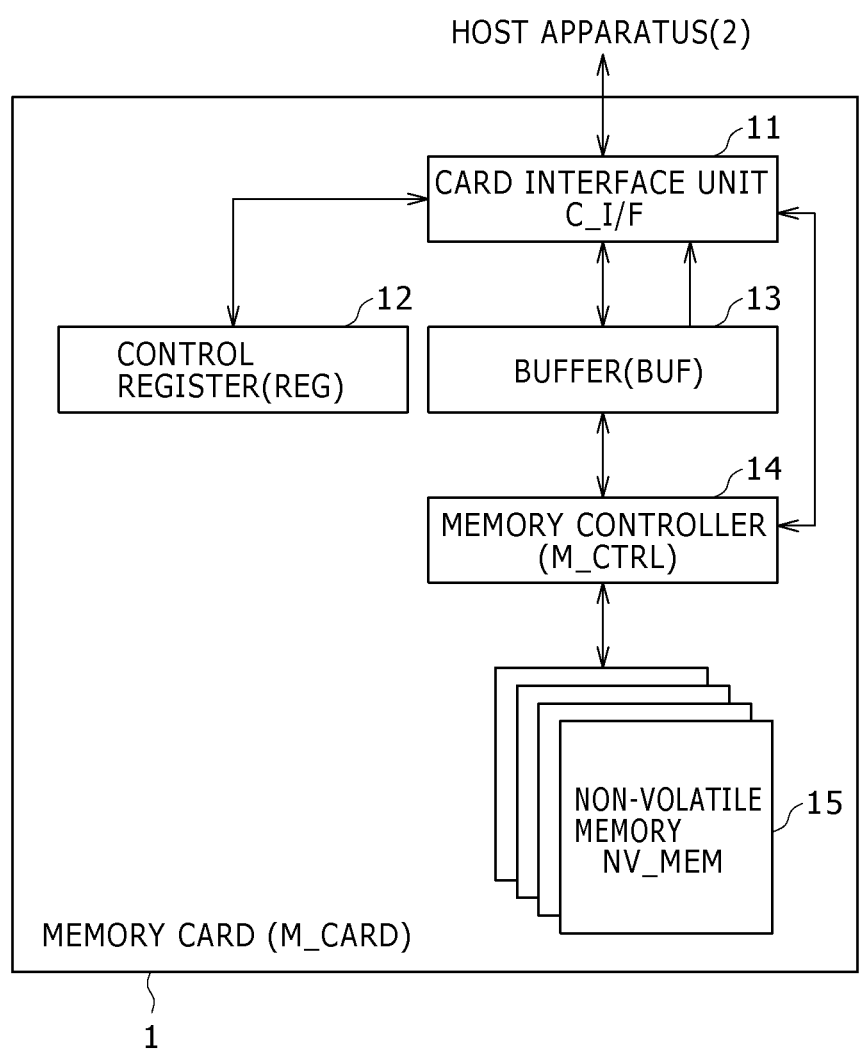
FIG. 1 is a block diagram of the hardware of a memory card according to an embodiment of the present invention.

FIG. 1 is a block diagram of the hardware level of a memory card 1 according to the embodiment of the present invention.

The memory card 1 of FIG. 1 has a card interface unit (C_I/F) 11, a control register (REG) 12, a buffer (BUF) 13, a memory controller (M_CTRL) 14, and a non-volatile memory (NV_MEM) 15.

The memory card 1 communicates with electronic apparatus in accordance with the standards of PCI Express.

Figure 2:
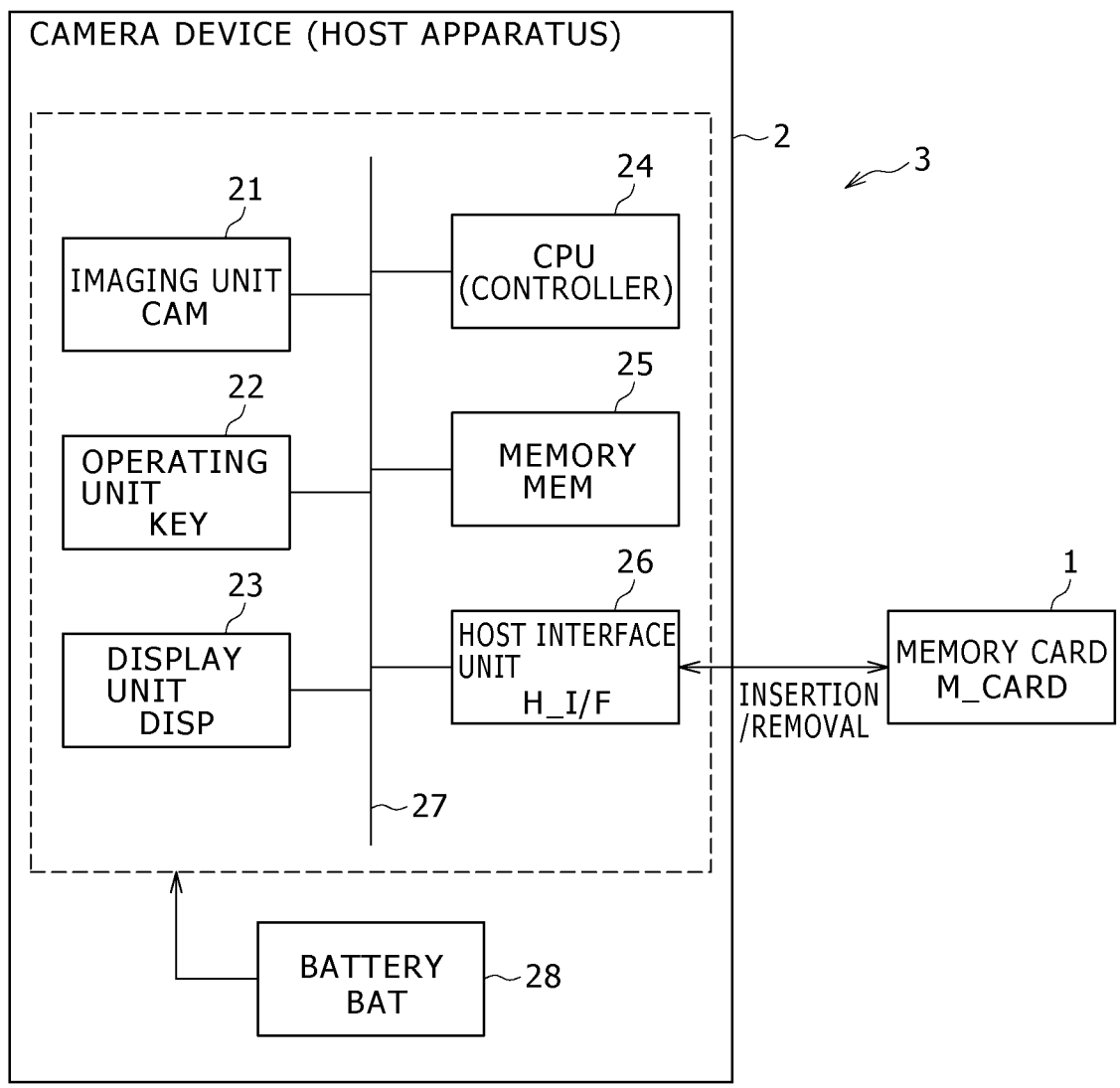
FIG. 2 is a schematic configuration diagram of a camera system in which the memory card of FIG. 1 is used.

FIG. 2 is a schematic configuration diagram of a camera system 3 in which the memory card 1 of FIG. 1 is used.

The camera system 3 of FIG. 2 has the memory card 1 of FIG. 1 and a camera device 2 as host apparatus.

The camera device 2 of FIG. 2 has an imaging unit (CAM) 21, an operating unit (KEY) 22, a display unit (DISP) 23, a CPU (Central Processing Unit) 24, a memory (MEM) 25, a host interface unit (H_I/F) 26, and a system bus 27 to connect these units to each other.

The camera device 2 is driven by a battery (BAT) 28.

The imaging unit 21 has a CMOS (Complementary Metal Oxide Semiconductor) sensor, a CCD (Charge Coupled Device Image Sensor), or the like.

The imaging unit 21 creates image data of a moving image or a still image and outputs a signal including the image data to the CPU 24.

The operating unit 22 has an imaging button, arrow keys, etc.

The operating unit 22 outputs a signal corresponding to the operated key to the CPU 24.

The display unit 23 has a TFT (Thin Film Transistor) display, an organic EL (Electro-Luminescence) display, or the like.

A video signal is input to the display unit 23 from the CPU 24, so that the display unit 23 displays the image of the video signal.

The memory 25 stores a program executed by the CPU 24 and data.

The CPU 24 reads the program stored in the memory 25 to execute the program.

Thereby, the controller of the camera device 2 is realized in the CPU 24.

The controller manages and controls the imaging unit 21, the display unit 23, the host interface unit 26, and so forth.

The host interface unit 26 has a slot compliant with the connection standards of PCI Express.

The memory card 1 of FIG. 1 is removably loaded in this slot.

The CPU 24 in the camera device 2 carries out imaging of e.g. a still image or a moving image and writes the image data of the obtained image to the memory card 1. At this time, the CPU 24 in the camera device 2 makes write access to the memory card 1.

The CPU 24 may make the write access to the memory card 1 in units of a predetermined amount of data.

Furthermore, the camera device 2 reads image data from the memory card 1 and displays an image on the display unit 23 for example. At this time, the CPU 24 in the camera device 2 makes read access to the memory card 1.

The CPU 24 may make the read access to the memory card 1 in units of a predetermined amount of data.

The non-volatile memory 15 in FIG. 1 is a non-volatile semiconductor memory such as a NAND flash memory or a NOR flash memory.

The non-volatile memory 15 stores write data of the camera device 2 and so forth.

The buffer 13 is a semiconductor memory such as an SRAM (Static Random Access Memory) or a DRAM (Dynamic Random Access Memory).

The buffer 13 temporarily stores write data to be written to the non-volatile memory 15 or read data read out from the non-volatile memory 15.

The memory controller 14 is connected to the non-volatile memory 15, the buffer 13, and the card interface unit 11.

When being instructed to store write data by the card interface unit 11, the memory controller 14 reads the write data from the buffer 13 and stores the write data in the non-volatile memory 15.

When being instructed to read out data by the card interface unit 11, the memory controller 14 reads the specified read data from the non-volatile memory 15 and stores the read data in the buffer 13.

To the control register 12, a command is written by the host apparatus via the card interface unit 11.

The card interface unit 11 communicates with the host apparatus by a communication system compliant with the communication standards of PCI Express.

The card interface unit 11 is connected to the control register 12, the buffer 13, and the memory controller 14.

The card interface unit 11 manages the processing of the whole of the memory card 1 and executes processing corresponding to the command written to the control register 12.

For example, when a write command is written to the control register 12, the card interface unit 11 writes, to the buffer 13, write data received from the host apparatus.

Furthermore, the card interface unit 11 outputs, to the memory controller 14, a signal to instruct the memory controller 14 to store the write data.

In addition, for example when a read command is written to the control register 12, the card interface unit 11 outputs, to the memory controller 14, a signal to instruct the memory controller 14 to read out data.

The card interface unit 11 reads read data from the buffer 13 to output the read data to the host apparatus.

[Communication System of PCI Express]

The communication system based on PCI Express will be described below.

Figure 3:
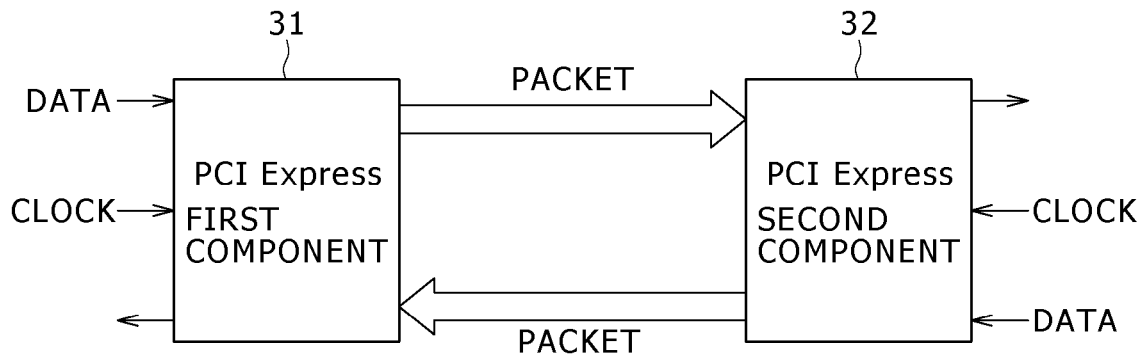
FIG. 3 is an explanatory diagram of the communication system of PCI Express.

FIG. 3 shows a first component 31 and a second component 32 communicating with each other by PCI Express.

The first component 31 corresponds to e.g. the camera device 2 as the host apparatus in the example of FIG. 1 and FIG. 2.

The second component 32 corresponds to the card interface unit 11 of the memory card 1.

Data and a clock signal are input to the first component 31 and the second component 32.

The clock signal can be generated by a clock generating circuit (not shown).

The first component 31 and the second component 32 are connected to each other by e.g. two pairs of differential transmission lines (differential signal line pairs). These two pairs of differential transmission lines are called lane.

In PCI Express, it is also possible to connect two components 31 and 32 to each other by plural lanes.

For example, in transmission of data from the first component 31 to the second component 32, the first component 31 outputs a packet of serial data to the second component 32 via one differential transmission line pair.

The second component 32 receives the packet from this one differential transmission line pair to acquire the data.

The second component 32 transmits a packet of serial data to the first component 31 via the other differential transmission line pair. The clock signal is superimposed on the serial data.

Figure 4:
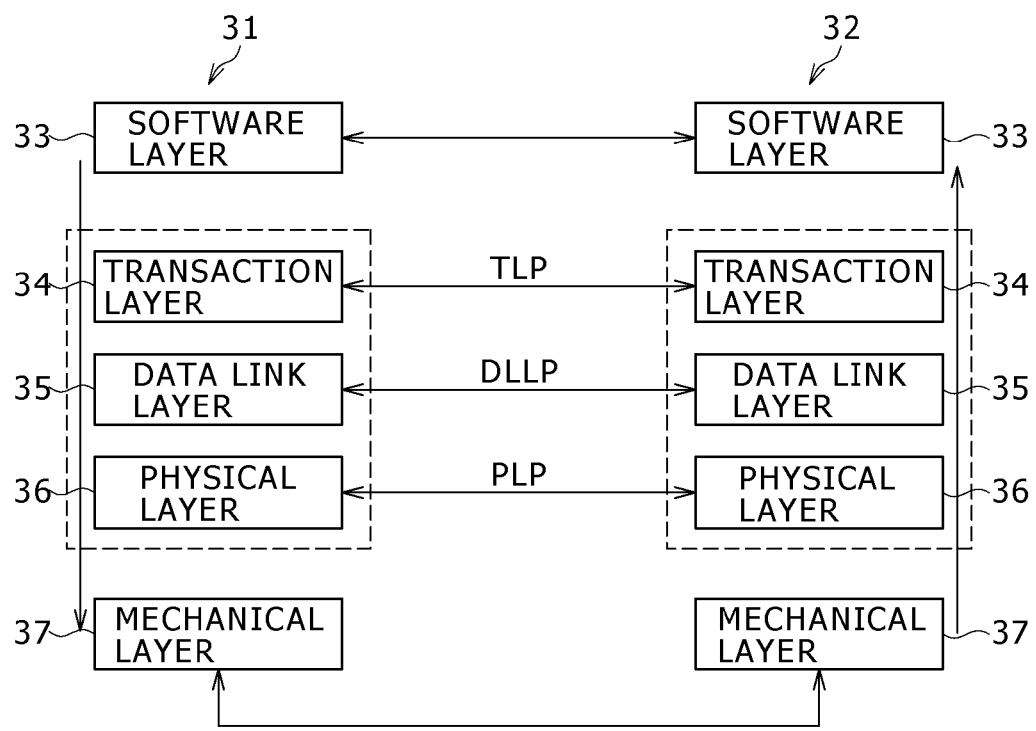
FIG. 4 is an explanatory diagram of the communication protocol of PCI Express.

FIG. 4 is an explanatory diagram of a communication protocol realized in two components 31 and 32 of FIG. 3 for data transmission by PCI Express.

In FIG. 4, as functions realized in the first component 31, a software layer 33, a transaction layer 34, a data link layer 35, a physical layer 36, and a mechanical layer 37 are represented.

Also in the second component 32, the software layer 33, the transaction layer 34, the data link layer 35, the physical layer 36, and the mechanical layer 37 are realized.

Figure 5:
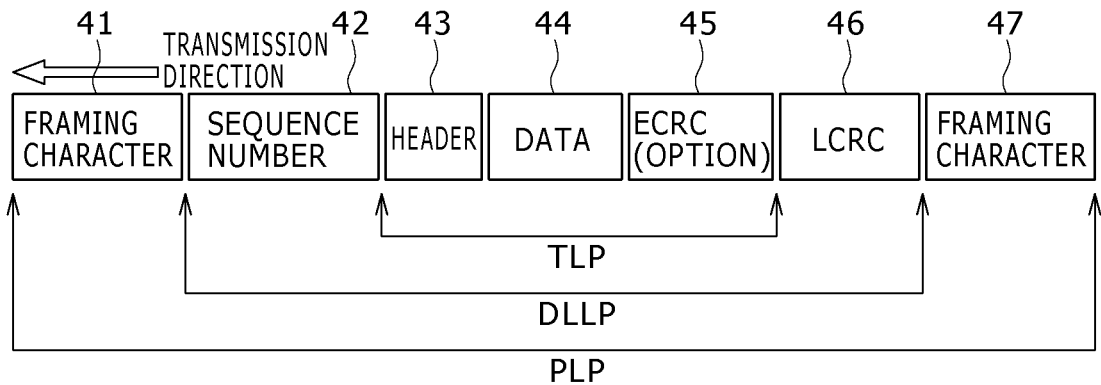
FIG. 5 is an explanatory diagram of the communication packet of PCI Express.

FIG. 5 is an explanatory diagram of the data structure of a packet transmitted/received between two components 31 and 32 of FIG. 4.

The packet of FIG. 5 is configured by framing character data 41, sequence number data 42, header data 43, actual data 44, ECRC data 45, LCRC data 46, and framing character data 47.

The software layer 33 in FIG. 4 utilizes data transmission by PCI Express.

The software layer 33 is e.g. a photographing controller of a camera to write a captured still image or moving image to the memory card 1.

Upon generation of the actual data 44 desired to be communicated, the software layer 33 starts transaction.

The transaction layer 34 performs packetization by adding a header and ECRC to the actual data 44 input from the software layer 33, to create a transaction layer packet (TLP).

The TLP is transmitted to the other transaction layer 34.

The other transaction layer 34 that has received the TLP detects an error in the actual data 44 by using the ECRC.

The data link layer 35 adds the sequence number data 42 and the LCRC data 46 to the TLP input from the transaction layer 34, to create a data link layer packet (DLLP).

The DLLP is transmitted to the other data link layer 35.

The other data link layer 35 detects an error in the TLP by using the LCRC data 46.

Furthermore, if the sequence number data 42 received by the other data link layer 35 is not in the predetermined order, the data link layer 35 makes the other data link layer 35 retransmit a DLLP of this sequence number data 42 if an error in the TLP is detected.

The physical layer 36 adds framing characters to the DLLP created by the data link layer 35, to create a physical layer packet (PLP) in FIG. 5.

The PLP is transmitted to the other physical layer 36.

Furthermore, the physical layer 36 transmits/receives a control signal such as an ordered set to/from the other physical layer 36 according to need. Examples of the ordered set include an electrical idle ordered set.

In the case of rendering the transmission line electrical idle, first the physical layer 36 transmits the electrical idle ordered set to the other physical layer 36. Thereafter, the physical layer 36 sets the differential transmission line pair for sending to the state corresponding to the electrical idle ordered set, to render the transmission line electrical idle. Thereby, the communication state of the component is set to the pause state.

The physical layer 36 has e.g. plural input/output ports to which the respective differential transmission line pairs are connected, analog buffers of the respective input/output ports, a SerDes circuit for an 8b/10b codec, and so forth.

The SerDes circuit converts parallel data to be transmitted to serial data. Furthermore, the SerDes circuit converts received serial data to parallel data.

The physical layer 36 transmits, to the other physical layer 36, the physical layer packet in FIG. 5 created by the physical layer 36, an ordered set, and so forth.

For example, the physical layer 36 transmits the data of the physical layer packet in FIG. 5 from the left-side data in sequence.

The data of the physical layer packet in FIG. 5 is transmitted as a signal of serial data from the differential transmission line pair for sending.

The mechanical layer 37 has a connector (not shown) and so forth.

[Power Supply Management of PCI Express]

Figure 6:
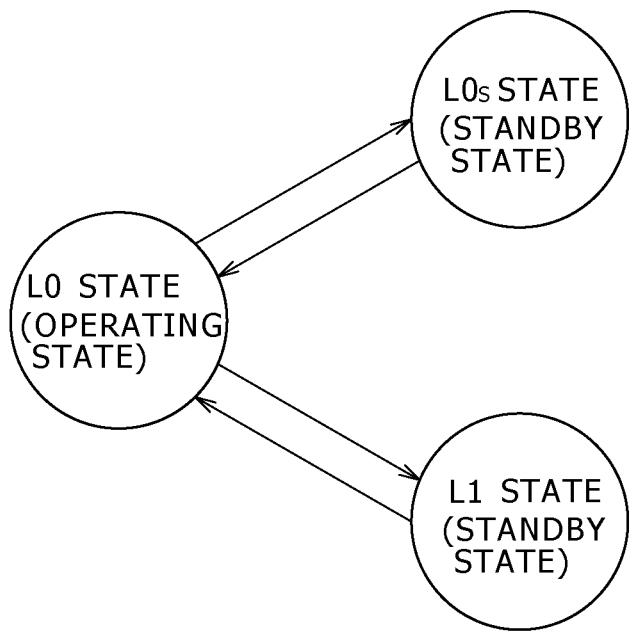
FIG. 6 is a state transition diagram of a component of PCI Express.

FIG. 6 is a transition diagram of the operation state of each component of FIG. 3.

Examples of the operation state of the component of PCI Express include an L0 state, an L0s state, and an L1 state.

The components 31 and 32 communicating with each other by PCI Express switch the operation state by active state power management (ASPM).

The L0 state is the communication-enabled state in which data communication can be carried out.

The L0s state and the L1 state are the standby state (pause state), and the L1 state is the state of a deeper pause compared with the L0s state.

In the L0s state, the link between the components by plural lanes is in the electrically-idle state. A clock signal is input to the respective components, and a PLL circuit of the SerDes circuit and so forth is fed with power and operates.

The time of restoration from the L0s state to the L0 state is e.g. several hundreds of nanoseconds to several microseconds.

In the L1 state, the link between the components is in the electrically-idle state. In the L1 state, the power feed is not stopped.

The time of restoration from the L1 state to the L0 state is e.g. several microseconds to several tens of microseconds.

In the restoration from the L1 state to the L0 state, the component becomes the recovery state from the L1 state and then is restored to the L0 state from the recovery state.

[Switching Operation from L0 to L1]

The components 31 and 32 control the operation state depending on the packet reception status and so forth.

Figure 7:
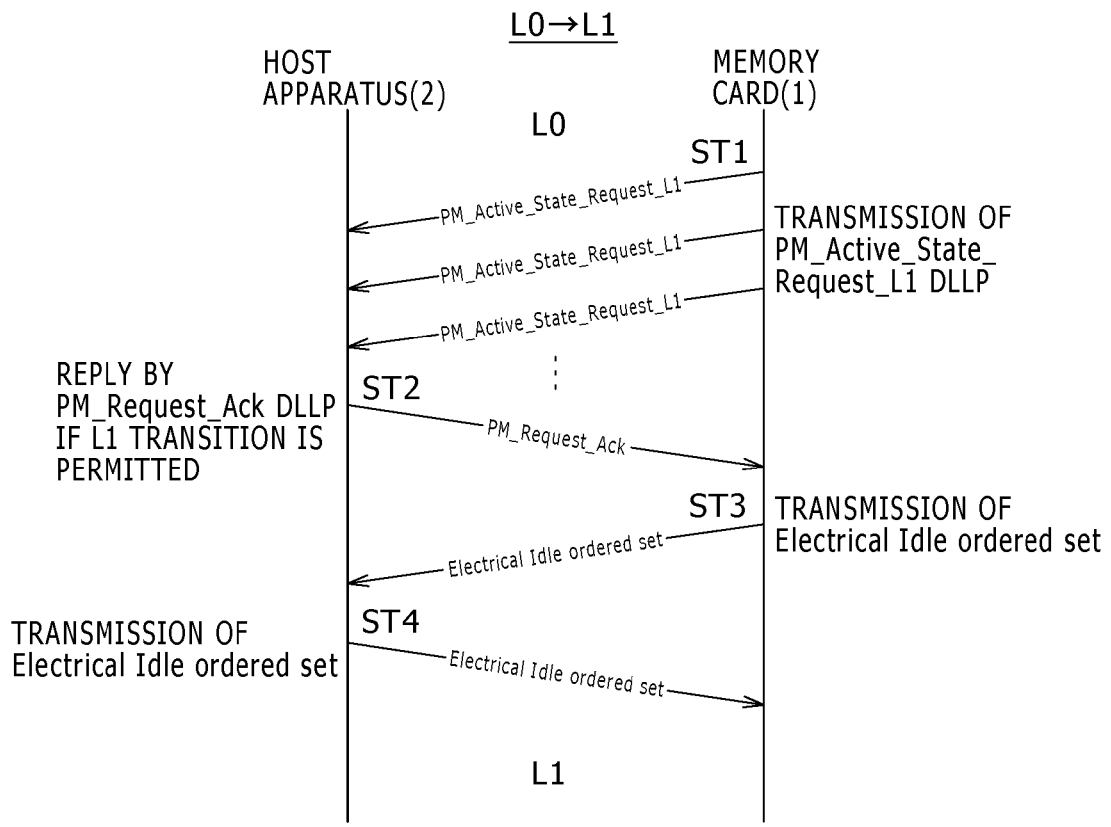
FIG. 7 is one example of a communication sequence chart of switching of the operation state from L0 to L1.

FIG. 7 is one example of a sequence chart of switching of the operation state of the host apparatus (2) and the memory card 1 from L0 to L1.

In the state switching from L0 to L1, the transaction layer 34 of the memory card 1 stops transmission of a new packet, and the data link layer 35 repeatedly transmits a request for the state switching from L0 to L1 (step ST1).

Upon receiving the switching request, the data link layer 35 of the host apparatus (2) transmits a switching acknowledgement (ACK) or a non-acknowledgement (NAK) depending on its own communication state (step ST2).

Furthermore, if the switching acknowledgement is transmitted, the transaction layer 34 prohibits transmission of a new packet.

If the switching acknowledgement is received, the data link layer 35 of the memory card 1 stops, and the physical layer 36 transmits an electrical idle ordered set (step ST3).

Upon receiving the electrical idle ordered set, the physical layer 36 of the host apparatus (2) stops the communication.

Furthermore, the physical layer 36 transmits an electrical idle ordered set (step ST4).

Thereby, the operation state of two components 31 and 32 is switched from L0 to L1.

In the pause state of L1, the physical layer 36, the data link layer 35, and the transaction layer 34 stop.

[Switching Operation from L0 to L0s]

Figure 8:
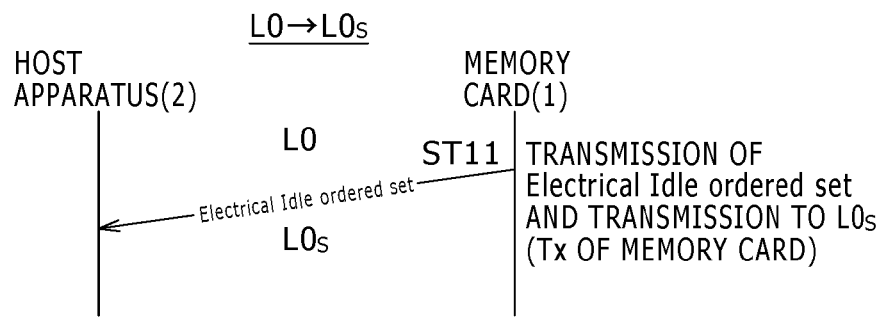
FIG. 8 is one example of a communication sequence chart of switching of the operation state from L0 to L0s.

FIG. 8 is one example of a sequence chart of switching of the operation state of the host apparatus (2) and the memory card 1 from L0 to L0s.

In the state switching from L0 to L0s, the physical layer 36 of the memory card 1 transmits an electrical idle ordered set (step ST11) and enters the pause state.

Upon receiving the electrical idle ordered set, the physical layer 36 of the component as the host apparatus (2) enters the pause state.

In the pause state of L0s, only the physical layer 36 stops.

The components 31 and 32 of PCI Express need to be switched from the L0 state to the L0s state if an idle period for seven microseconds or longer has occurred.

Therefore, the respective components 31 and 32 have a timer (not shown) and measure the idle period by this timer.

In contrast, in the standards of PCI Express, the implementer can decide the condition for switching to the L1 state.

Thus, the respective components 31 and 32 do not need to use the timer for the switching to the L1 state.

[Switching Operation from L1 to L0]

Figure 9:
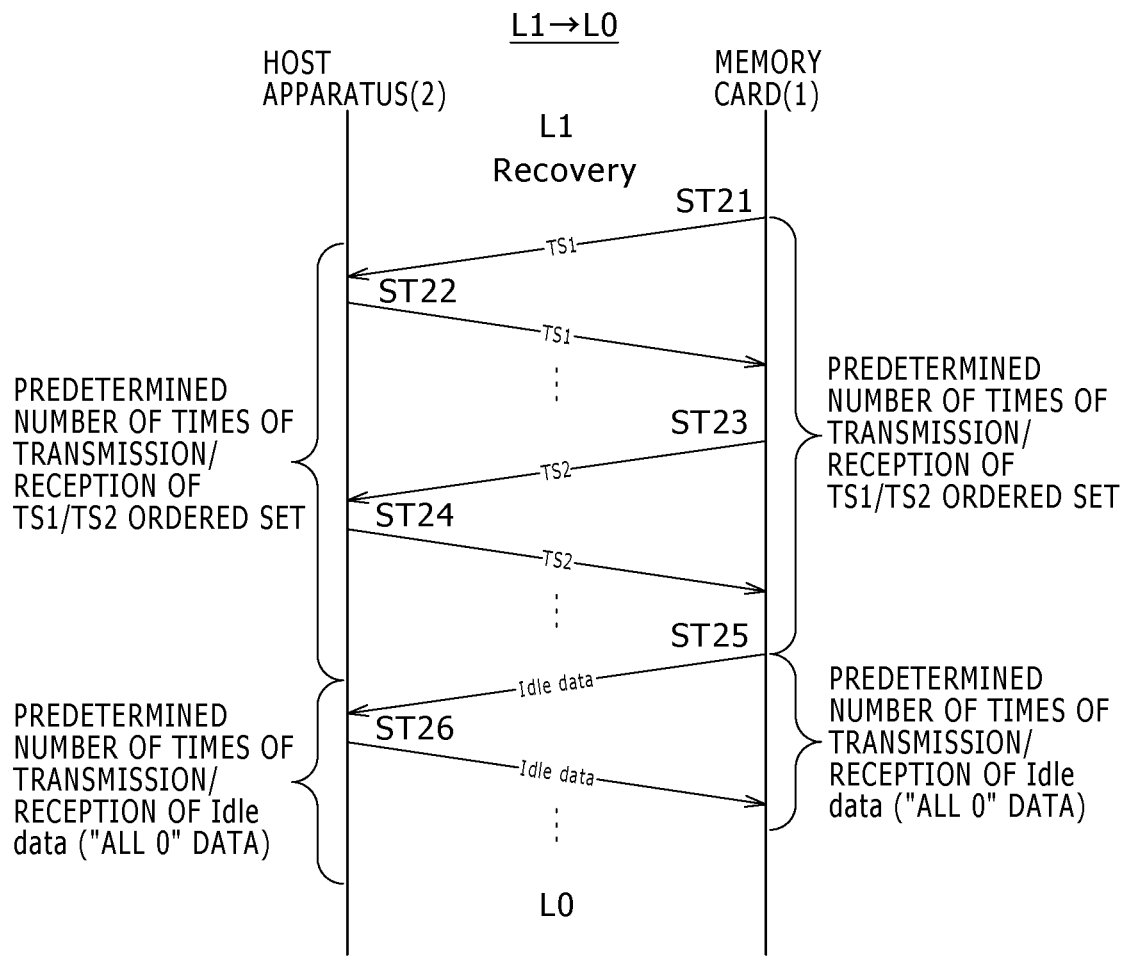
FIG. 9 is one example of a communication sequence chart of switching of the operation state from L1 to L0.

FIG. 9 is one example of a sequence chart of switching of the operation state of the host apparatus (2) and the memory card 1 from L1 to L0.

In the state switching from L1 to L0, the physical layer 36 inactivates the electrical idle.

After the inactivation of the electrical idle, one component transmits a TS1 ordered set to the other component a predetermined number of times and transmits a TS2 ordered set to the other component a predetermined number of times (steps ST21 and ST23).

The other component also transmits the TS1 ordered set to one component a predetermined number of times and transmits the TS2 ordered set to one component a predetermined number of times (steps ST22 and ST24).

Specifically, after the inactivation of the electrical idle, each component starts the transmission of the TS1 ordered set. Each component continues the transmission of the TS1 ordered set until receiving eight TS1 or TS2 ordered sets consecutively.

Upon receiving eight TS1 or TS2 ordered sets consecutively, the operation of each component is switched to transmission of the TS2 ordered set. Each component continues the transmission of the TS2 ordered set until receiving eight TS2 ordered sets consecutively and ending the transmission of 16 TS2 ordered sets after reception of one TS2 ordered set.

By the TS1 ordered set and the TS2 ordered set, the components exchange a COM symbol, a link symbol, a lane symbol, data for training, etc.

Next, upon ending the transmission of the TS2 ordered set, one component transmits a packet of idle data to the other component a predetermined number of times (step ST25).

The packet of idle data is transmitted to the data link layer 35 and the transaction layer 34 of the other component by the data link layer 35 or the transaction layer 34 of one component.

All of the data of this packet have to be zero.

The other component also transmits a packet of idle data to one component a predetermined number of times, upon ending the transmission of the TS2 ordered set (step ST26).

Specifically, each of the components that have ended the transmission of the TS2 ordered set starts the transmission of the idle data. Each component continues the transmission of the idle data until receiving eight idle data consecutively and ending the transmission of 16 idle data after reception of one idle data.

Thereby, the operation state of two components 31 and 32 is restored from L1 to L0 via the recovery state.

[Switching Operation from L0s to L0]

Figure 10:
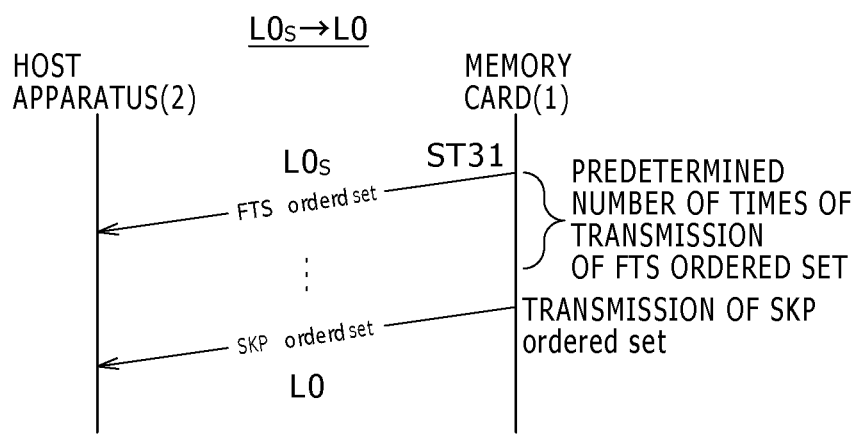
FIG. 10 is one example of a communication sequence chart of switching of the operation state from L0s to L0.

FIG. 10 is one example of a sequence chart of switching of the operation state of the host apparatus (2) and the memory card 1 from L0s to L0.

In the pause state of L0s, only the physical layer 36 stops.

In the state switching from L0s to L0, the physical layer 36 of one component transmits predetermined ordered sets (FTS ordered set and SKP ordered set) after being restored from the stop state (step ST31).

Upon receiving these ordered sets, the physical layer 36 of the other component is restored from the pause state.

[Access to Memory Card 1 by Host Apparatus]

Descriptions will be made below about the operation of the memory card 1 when the camera device 2 as the host apparatus makes write access or read access to the memory card 1.

In the write access, the card interface unit 11 receives data from the host apparatus and writes the data to the buffer 13. The memory controller 14 reads data from the buffer 13 and writes the data to the non-volatile memory 15.

In the read access, the memory controller 14 reads data from the non-volatile memory 15 and writes the data to the buffer 13. The card interface unit 11 reads data from the buffer 13 and transmits the data to the host apparatus.

The card interface unit 11 enters the standby state (e.g. L1) in the write access or the read access.

[Power Supply Management in Period of Write Access by Host Apparatus]

Figure 11:
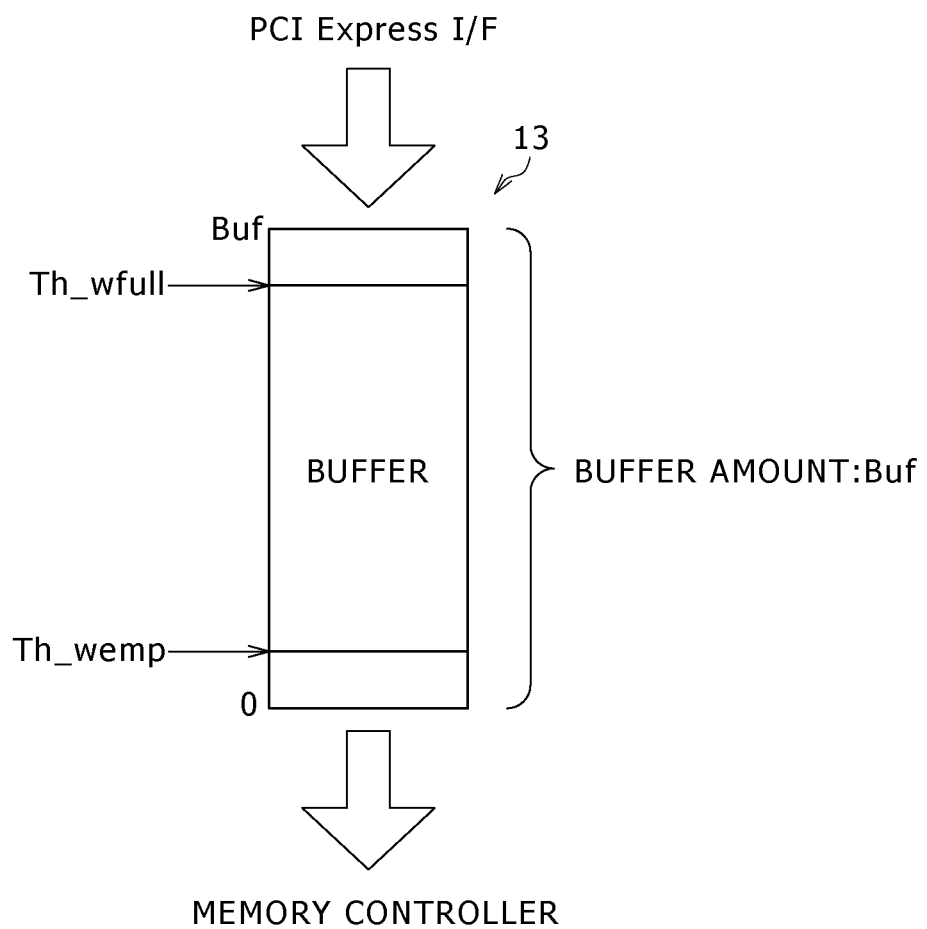
FIG. 11 is an explanatory diagram of the memory space relating to control of the operation state dependent on the state of a buffer in a write access period.

FIG. 11 is an explanatory diagram of the memory space of the buffer 13 in FIG. 1.

As shown in FIG. 11, for pause control in the write access, a write upper-limit threshold (Th_wfull) and a write lower-limit threshold (Th_wemp) are set relative to the total buffer amount (Buf) of the buffer 13.

The write upper-limit threshold and the write lower-limit threshold may be stored in e.g. the non-volatile memory 15.

The write upper-limit threshold is the upper-limit threshold at which control to take a pause in data writing to the buffer 13 by the card interface unit 11 is started.

The card interface unit 11 shifts to the standby state (e.g. L1) when the amount of not-yet-processed write data in the buffer 13 surpasses this write upper-limit threshold.

The write lower-limit threshold is the lower-limit threshold at which control to restart the data writing to the buffer 13 by the card interface unit 11 is started.

The card interface unit 11 is restored from the standby state when the amount of not-yet-processed write data in the buffer 13 becomes smaller than this write lower-limit threshold.

In the write access, the card interface unit 11 monitors the remaining storage capacity of the buffer 13 and switches its own operation state based on the write upper-limit threshold and the write lower-limit threshold.

For example, when the amount of not-yet-processed write data in the buffer 13 surpasses the write upper-limit threshold in the write access, the card interface unit 11 sets its own operation state to the standby state (e.g. L0s) until the amount of not-yet-processed data becomes smaller than the write lower-limit threshold.

Figure 12:
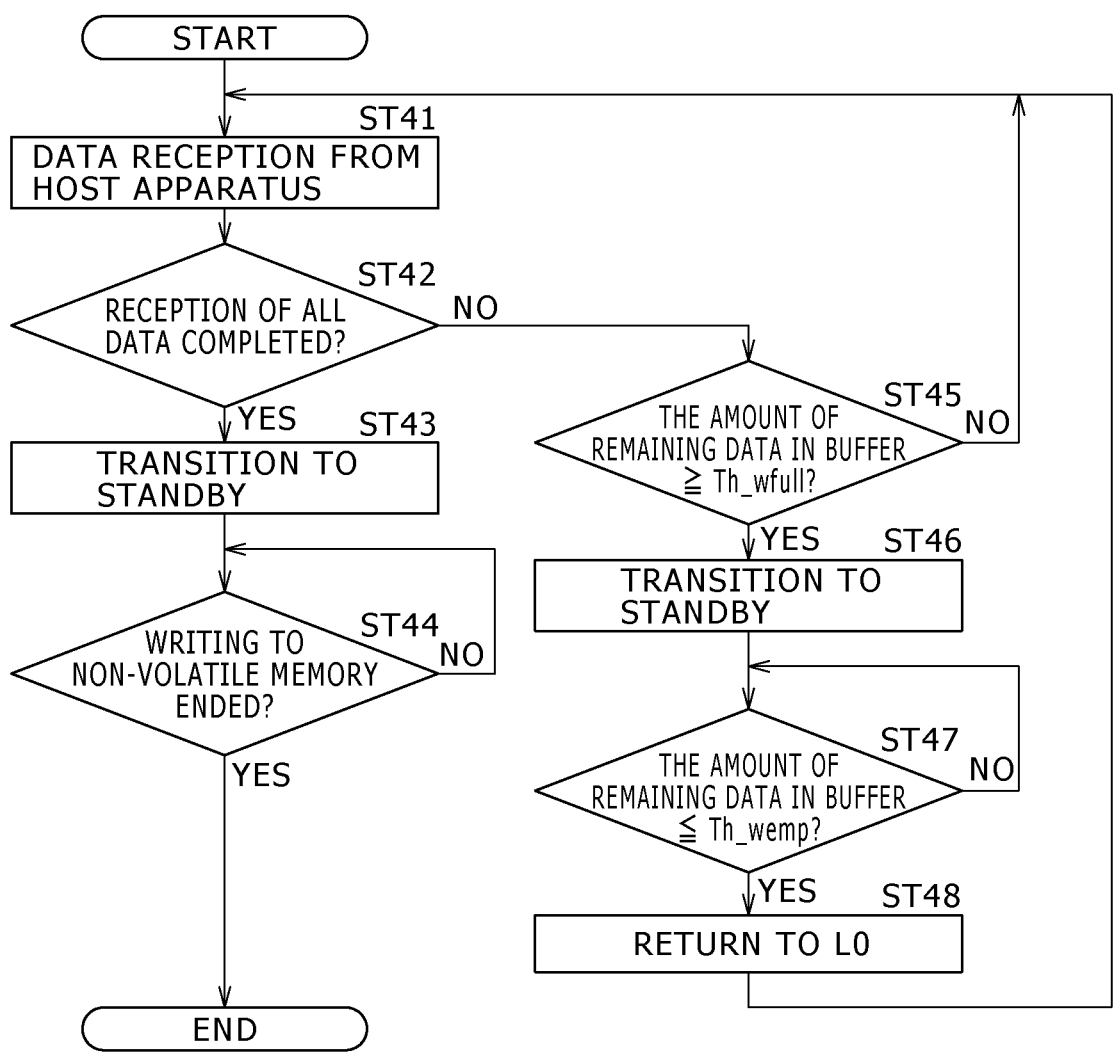
FIG. 12 is a flowchart of state control in the write access period.

FIG. 12 is a flowchart of the state control carried out by the card interface unit 11 in FIG. 1 during the write access.

Upon writing of a write command to the control register 12 by the host apparatus, the memory card 1 starts processing of writing to the non-volatile memory 15.

The card interface unit 11 receives packetized write data from the host apparatus (step ST41).

The card interface unit 11 writes the received write data to the buffer 13.

Upon receiving the packetized write data, the card interface unit 11 determines whether or not reception of all of the write data in this one time of write access has been completed (step ST42).

If the reception of all of the write data has been completed, the card interface unit 11 carries out control to switch its own operation state from the L0 state to the standby state (step ST43).

For example, in the case of the switching to the L1 state, the card interface unit 11 executes the communication processing of FIG. 7 with the component of the host apparatus and switches its own operation state from the L0 state to the L1 state.

In the case of the switching to the L0s state, the card interface unit 11 executes the communication processing of FIG. 8 with the component of the host apparatus and switches its own operation state from the L0 state to the L0s state.

Thereafter, the card interface unit 11 in the standby state waits for the end of the operation of writing to the non-volatile memory 15, and determines that the write processing is ended (step ST44).

The card interface unit 11 may end the write processing after being restored to L0.

If it is determined by the card interface unit 11 in the step ST42 that the reception of all of the write data has not been completed, the card interface unit 11 determines whether or not the amount of not-yet-processed write data in the buffer 13 is equal to or larger than the write upper-limit threshold (step ST45).

Specifically, for example, the card interface unit 11 reads the free space of the buffer 13 and subtracts the free space from the total buffer amount of the buffer 13, to determine whether or not the capacity obtained by the subtraction is equal to or larger than the write upper-limit threshold.

If the amount of not-yet-processed write data in the buffer 13 is not equal to or larger than the write upper-limit threshold, the card interface unit 11 enters the state of waiting for reception of the next write data (step ST41).

If the amount of not-yet-processed write data in the buffer 13 is equal to or larger than the write upper-limit threshold, the card interface unit 11 carries out control to switch its own operation state from the L0 state to the standby state (step ST46).

For example, in the case of the switching to the L0s state, the card interface unit 11 executes the communication processing of FIG. 8 with the component of the host apparatus and switches its own operation state from the L0 state to the L0s state.

In the case of the switching to the L1 state, the card interface unit 11 executes the communication processing of FIG. 7 with the component of the host apparatus and switches its own operation state from the L0 state to the L1 state.

Thereafter, the card interface unit 11 monitors the buffer 13. The card interface unit 11 repeatedly determines whether or not the amount of not-yet-processed write data in the buffer 13 has become equal to or smaller than the write lower-limit threshold (step ST47).

If the amount of not-yet-processed write data in the buffer 13 has become equal to or smaller than the write lower-limit threshold, the card interface unit 11 carries out control to switch its own operation state from the standby state to the communication-enabled L0 state (step ST48).

Specifically, the card interface unit 11 executes the communication processing of FIG. 9 or FIG. 10 with the component of the host apparatus and switches its own operation state from the standby state to the L0 state.

If the card interface unit 11 returns to the communication-enabled L0 state, it is in the state of waiting for reception of the next write data.

Figure 13:
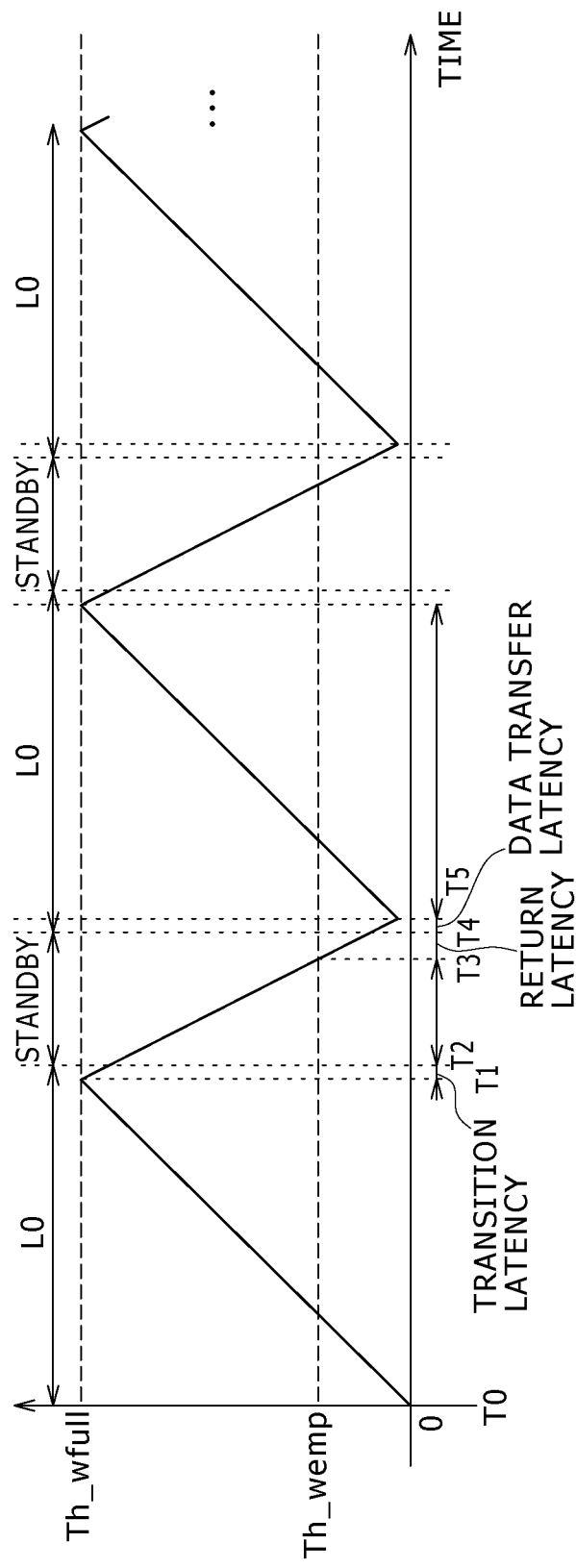
FIG. 13 is an explanatory diagram showing one example of time change in the amount of not-yet-processed write data in the buffer in the write access period.

FIG. 13 is an explanatory diagram showing one example of time change in the amount of not-yet-processed write data in the buffer 13 under the control of FIG. 12.

In FIG. 13, the abscissa indicates the time and the ordinate indicates the amount of not-yet-processed write data in the buffer 13.

Under the control of FIG. 12, the amount of not-yet-processed write data in the buffer 13 in one time of write access rises from zero at a writing start time T0 to the write upper-limit threshold.

This is because the speed of the communication between the card interface unit 11 and the host apparatus is higher than the speed of reading of write data from the buffer 13 by the memory controller 14 for writing of the data to the non-volatile memory 15.

In general, the speed of data writing to a flash memory is not high.

If the amount of not-yet-processed write data in the buffer 13 reaches the write upper-limit threshold at a time T1, the card interface unit 11 switches from the operating state (L0) to the standby state at a time T2 after transition latency.

Even after the switching of the card interface unit 11 to the standby state, the memory controller 14 writes the write data in the buffer 13 to the non-volatile memory 15.

Thus, the amount of not-yet-processed write data in the buffer 13 begins to decrease.

Furthermore, the card interface unit 11 switched to the standby state monitors the buffer 13.

If the amount of not-yet-processed write data in the buffer 13 becomes equal to or smaller than the write lower-limit threshold at a time T3, the card interface unit 11 switches to the operating state (L0) at a time T4 after return latency.

The card interface unit 11 switched to the operating state restarts reception of write data from the host apparatus at a time T5 after data transfer latency and writes the data to the buffer 13.

Thereby, the amount of not-yet-processed write data in the buffer 13 begins to rise again.

In this manner, the card interface unit 11 switches between the operating state and the standby state in one time of write access.

The amount of not-yet-processed write data in the buffer 13 increases and decreases on the basis of the write upper-limit threshold and the write lower-limit threshold.

Therefore, the buffer 13 does not get full with not-yet-processed write data.

The provision of the write upper-limit threshold is because of implementation reasons.

For example, it is preferable to provide this write upper-limit threshold if an implementation problem occurs, such as impossibility of transition to the standby state during the period when the buffer 13 is full with not-yet-processed write data and data transfer from the card interface unit 11 is stopped.

In contrast, the write upper-limit threshold does not have to be provided if the state in which the buffer 13 is full with not-yet-processed write data causes no implementation problem.

The memory controller 14 processes write data in the buffer 13 in one time of write access.

However, due to the control based on the write lower-limit threshold, exhaustion of not-yet-processed write data in the buffer 13 does not occur.

Furthermore, the empty state of the buffer 13 does not occur also in the period until return from the standby state to L0.

As a result, the memory controller 14 can process write data in the buffer 13 continuously during one time of write access.

[Power Supply Management in Period of Read Access by Host Apparatus]

Figure 14:
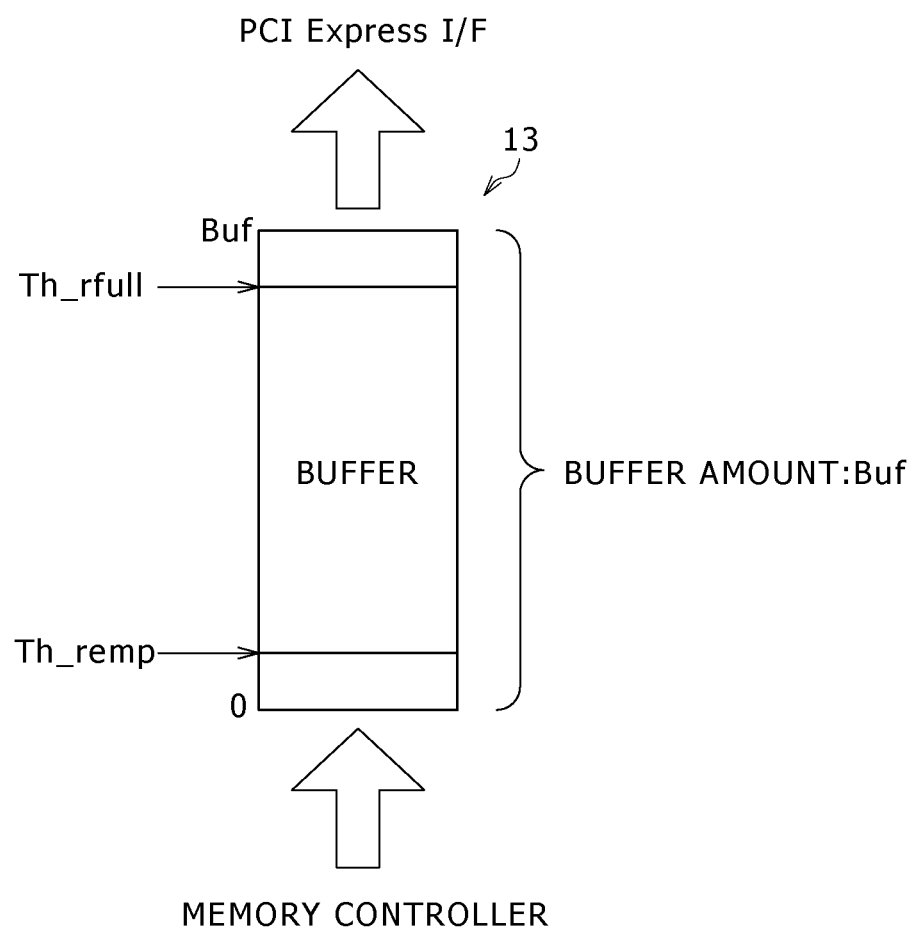
FIG. 14 is an explanatory diagram of the memory space relating to control of the operation state dependent on the state of the buffer in a read access period.

FIG. 14 is an explanatory diagram of the memory space of the buffer 13 in FIG. 1.

As shown in FIG. 14, for pause control in the read access, a read upper-limit threshold (Th_rfull) and a read lower-limit threshold (Th_remp) are set relative to the total buffer amount (Buf) of the buffer 13.

The read upper-limit threshold and the read lower-limit threshold may be stored in e.g. the non-volatile memory 15.

The read lower-limit threshold is the lower-limit threshold at which control to take a pause in data reading from the buffer 13 by the card interface unit 11 is started.

The card interface unit 11 shifts to the standby state (e.g. L1) when the amount of not-yet-processed read data in the buffer 13 becomes smaller than this read lower-limit threshold.

The read upper-limit threshold is the upper-limit threshold at which control to restart the data reading from the buffer 13 by the card interface unit 11 is started.

The card interface unit 11 is restored from the standby state when the amount of not-yet-processed read data in the buffer 13 surpasses this read upper-limit threshold.

In the read access, the card interface unit 11 monitors the remaining storage capacity of the buffer 13 and switches its own operation state based on the read upper-limit threshold and the read lower-limit threshold.

For example, when the amount of not-yet-processed read data in the buffer 13 becomes smaller than the read lower-limit threshold in the read access, the card interface unit 11 sets its own operation state to the standby state (e.g. L0s) until the amount of not-yet-processed data surpasses the read upper-limit threshold.

Figure 15:
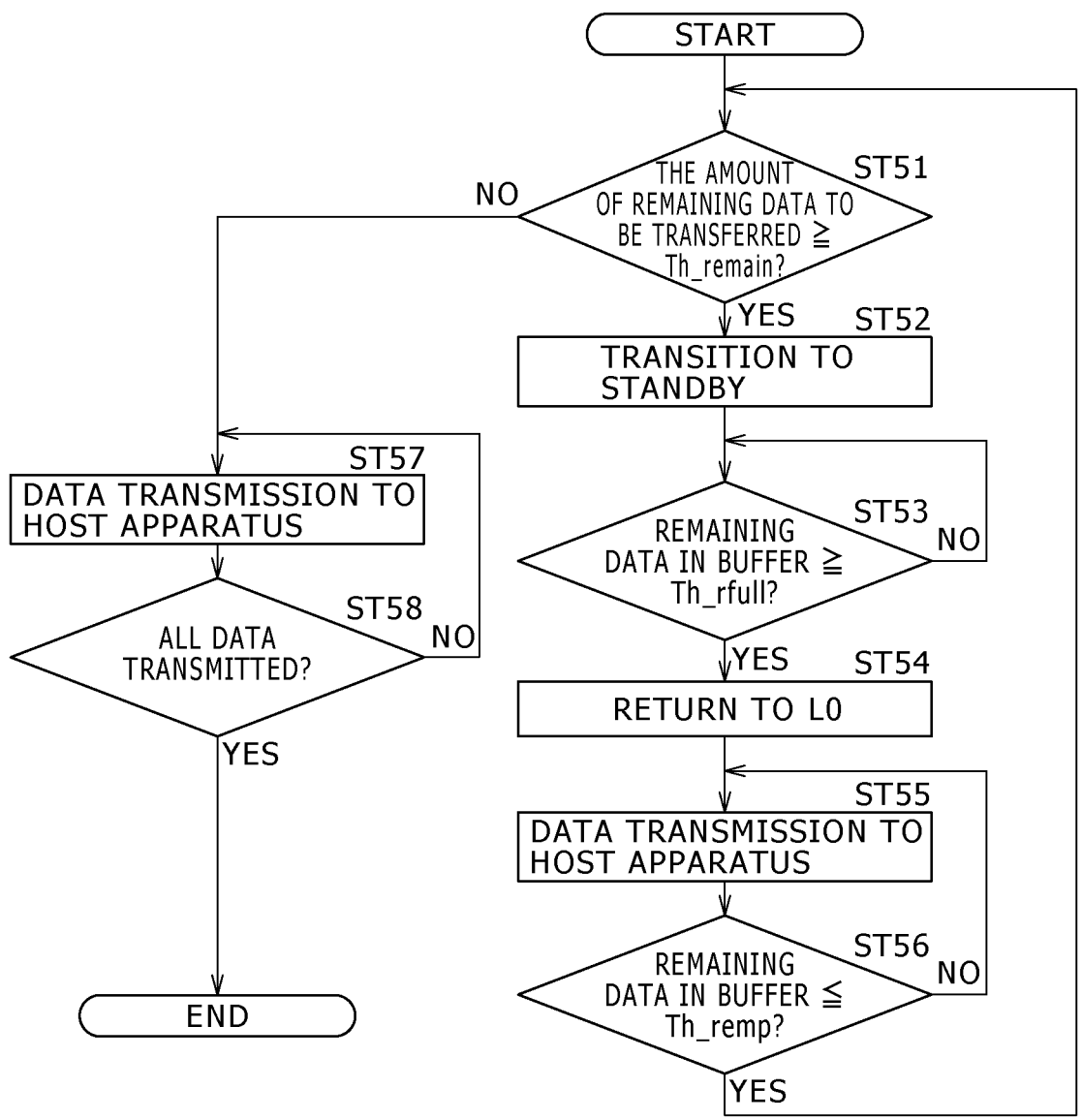
FIG. 15 is a flowchart of state control in the read access period.

FIG. 15 is a flowchart of the state control carried out by the card interface unit 11 in FIG. 1 during the write access.

Upon writing of a read command to the control register 12 by the host apparatus, the memory card 1 starts processing of reading from the non-volatile memory 15.

The card interface unit 11 instructs the memory controller 14 to perform reading.

The memory controller 14 reads out data from the non-volatile memory 15 and writes the data to the buffer 13.

The card interface unit 11 determines whether or not the amount of remaining data to be transferred is equal to or larger than a predetermined value (Th_remain) (step ST51).

As this predetermined value, e.g. a value larger than the read upper-limit threshold is employed.

Making the determination relating to this value can prevent the occurrence of the deadlock state in which the card interface unit 11 waits for accumulation of data whose amount is equal to or larger than the read upper-limit threshold although only data whose amount is smaller than the read upper-limit threshold remains.

If the amount of remaining data to be transferred is equal to or larger than the predetermined value, the card interface unit 11 starts transition to the standby state (step ST52).

The card interface unit 11 executes the communication processing of FIG. 7 or FIG. 8 with the component of the host apparatus and switches its own operation state to the standby state.

Thereafter, the card interface unit 11 monitors the buffer 13.

The card interface unit 11 repeatedly determines whether or not the amount of not-yet-processed read data in the buffer 13 has become equal to or larger than the read upper-limit threshold (step ST53).

If the amount of not-yet-processed read data in the buffer 13 has become equal to or larger than the read upper-limit threshold, the card interface unit 11 carries out control to switch its own operation state from the standby state to the communication-enabled L0 state (step ST54).

Specifically, the card interface unit 11 executes the communication processing of FIG. 9 or FIG. 10 with the component of the host apparatus and switches its own operation state from the standby state to the L0 state.

Upon returning to the communication-enabled L0 state, the card interface unit 11 reads read data from the buffer 13 and transmits the data to the host apparatus (step ST55).

Furthermore, the card interface unit 11 monitors the buffer 13.

The card interface unit 11 determines whether or not the amount of not-yet-processed read data in the buffer 13 has become equal to or smaller than the read lower-limit threshold (step ST56).

The card interface unit 11 reads read data from the buffer 13 and transmits the data to the host apparatus until the amount of not-yet-processed read data in the buffer 13 becomes equal to or smaller than the read lower-limit threshold.

If the amount of not-yet-processed read data in the buffer 13 becomes equal to or smaller than the read lower-limit threshold, the card interface unit 11 returns to the step ST51 and determines whether or not the amount of remaining data to be transferred is equal to or larger than the predetermined value (Th_remain).

If the amount of remaining data to be transferred is equal to or larger than the predetermined value, the card interface unit 11 repeats the processing from the step ST52 to the step ST56.

If the amount of remaining data to be transferred has decreased to be smaller than the predetermined value, the card interface unit 11 continues the processing of transfer of read data to the host apparatus (step ST57).

The card interface unit 11 determines whether or not all of the data relating to the request have been transferred (step ST58).

The card interface unit 11 reads read data from the buffer 13 and transmits the data to the host apparatus until the transfer of all of the data relating to the request has been ended.

Upon ending the transfer of all of the data relating to the request, the card interface unit 11 ends the read processing.

The card interface unit 11 may end the read processing after being switched to the standby state.

Figure 16:
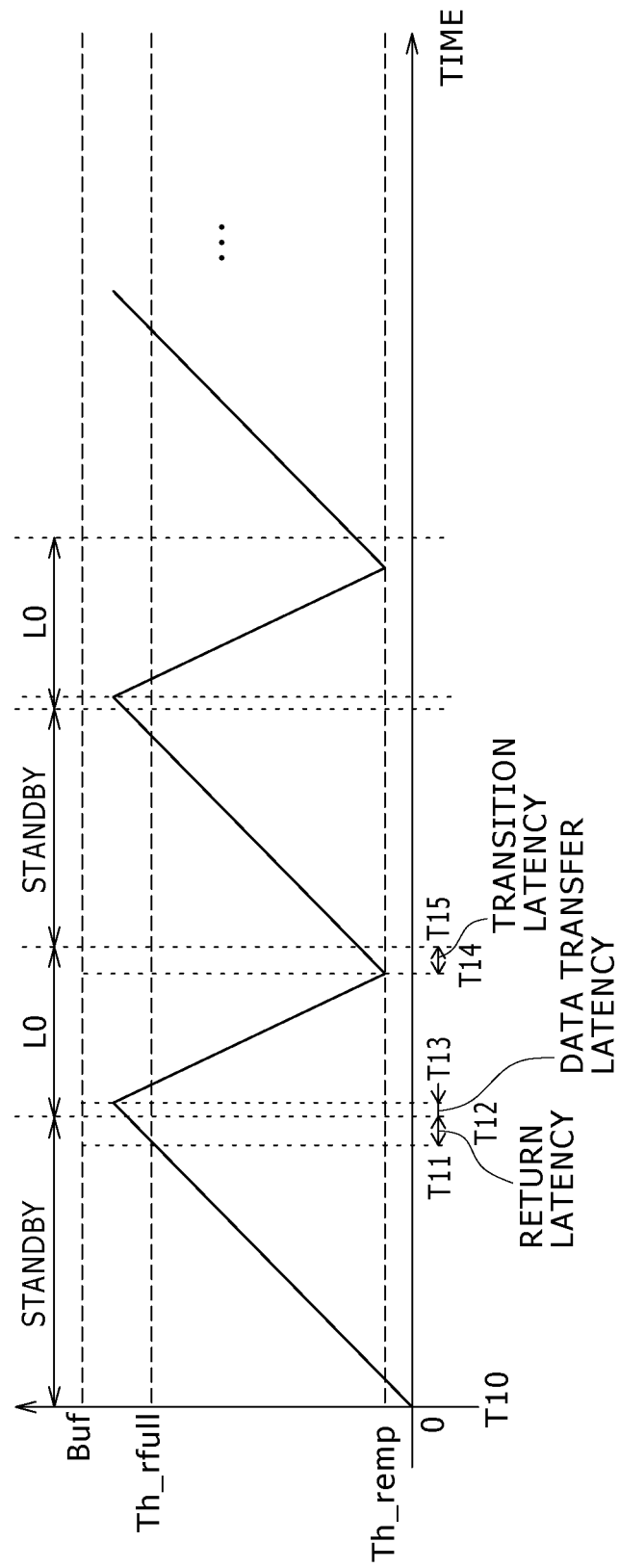
FIG. 16 is an explanatory diagram showing one example of time change in the amount of not-yet-processed read data in the buffer in the read access period.

FIG. 16 is an explanatory diagram showing one example of time change in the amount of not-yet-processed read data in the buffer 13 under the control of FIG. 15.

In FIG. 16, the abscissa indicates the time and the ordinate indicates the amount of not-yet-processed read data in the buffer 13.

Under the control of FIG. 15, the card interface unit 11 enters the standby state if the amount of remaining data to be accessed and transferred is equal to or larger than the predetermined value Th_remain.

Thus, the amount of not-yet-processed read data in the buffer 13 rises from zero at a reading start time T10 to the read upper-limit threshold.

This is because the card interface unit 11 has become the standby state due to the processing of the step ST52 at the timing of the read processing start.

If the amount of not-yet-processed read data in the buffer 13 reaches the read upper-limit threshold at a time T11, the card interface unit 11 switches from the standby state to the operating state (L0) at a time T12 after return latency.

The card interface unit 11 switched to the operating state starts transmission of read data at a time T13 after data transfer latency.

Thereby, the amount of not-yet-processed read data in the buffer 13 begins to decrease.

The card interface unit 11 monitors the buffer 13 while transferring read data in the buffer 13 to the host apparatus.

If the amount of not-yet-processed read data in the buffer 13 becomes equal to or smaller than the read lower-limit threshold at a time T14, the card interface unit 11 switches from the operating state (L0) to the standby state at a time T15 after transition latency.

In this manner, the card interface unit 11 switches between the operating state and the standby state in one time of read access.

The amount of not-yet-processed read data in the buffer 13 increases and decreases on the basis of the read upper-limit threshold and the read lower-limit threshold.

The not-yet-processed read data in the buffer 13 is not exhausted and not completely fills the buffer 13.

In the case of a system in which the empty state of the buffer 13 in reading causes no problem, the read lower-limit threshold does not have to be provided.

The card interface unit 11 processes read data in the buffer 13 in each round of the communication-enabled period.

Due to the control based on the read lower-limit threshold, exhaustion of not-yet-processed read data in the buffer 13 does not occur.

Thus, the empty state of the buffer 13 does not occur also in the period until transition from L0 to the standby state.

As a result, the card interface unit 11 processes read data in the buffer 13 continuously in each round of the communication-enabled period.

Furthermore, the provision of the read upper-limit threshold can prevent the buffer 13 from being completely filled in the periods of the return latency and the data transfer latency.

This can eliminate the influence given to the read speed of the memory card 1 by the latency until return from the standby state to L0 and the start of data transmission.

As described above, in the present embodiment, the card interface unit 11 is made to take a pause if the capacity of the buffer 13 is insufficient in the period of write access by the camera device 2 as the host apparatus.

The card interface unit 11 intermittently operates during this write access period.

Thus, in the present embodiment, the power consumption during the write access period can be reduced.

Furthermore, because the card interface unit 11 operates based on the communication system of PCI Express, by which high-speed serial data communication is carried out, the effect of the reduction in the power consumption is large.

Furthermore, the card interface unit 11 monitors the capacity of the buffer 13. The card interface unit 11 enters the pause state if the amount of not-yet-processed write data surpasses the write upper-limit threshold, and is restored from the pause state to the communication-enabled state if the amount of not-yet-processed write data becomes smaller than the write lower-limit threshold.

That is, in the present embodiment, not-yet-processed write data is left in the buffer 13 although the card interface unit 11 is made to intermittently operate during the write access period.

Thus, the memory controller 14 carries on the write processing continuously during the write access period.

Consequently, in the present embodiment, the effective write speed is not lowered in the processing of writing to the storage device.

The camera device 2 as the host apparatus can make write access at the effective write speed limited by the processing of writing to the non-volatile memory 15 by the memory controller 14.

In contrast, for example it would also be possible to employ a configuration in which, differently from the present embodiment, the card interface unit 11 measures e.g. the communication-absent period by a timer irrespective of the state of the buffer 13 and switches from the operating state to the standby state in response to the elapse of the communication-absent period.

However, if a timer is used in this manner, switching to the standby state in the period of write access by the host apparatus is substantially difficult, and thus the large effect of reduction in the power consumption can not be achieved.

Furthermore, even if the communication-absent period of the timer is shortened so that switching to the standby state may be allowed in the period of write access by the host apparatus, the buffer gets empty immediately after transition to the standby state and the memory controller 14 enters the state of waiting for the next write data in some cases.

In this case, the time until the end of processing of the write data by the memory controller 14 is extended by this waiting time, so that the effective write speed of the memory controller 14 is lowered.

Furthermore, in the present embodiment, the card interface unit 11 is made to take a pause in the state in which the amount of not-yet-processed read data in the buffer 13 is small in the period of read access by the camera device 2 as the host apparatus.

The card interface unit 11 intermittently operates during this read access period.

Thus, in the present embodiment, the power consumption during the read access period can be reduced.

Furthermore, the card interface unit 11 monitors the capacity of the buffer 13. The card interface unit 11 is restored from the pause state if the amount of not-yet-processed read data surpasses the read upper-limit threshold, and takes a pause if the amount of not-yet-processed read data becomes smaller than the read lower-limit threshold.

That is, in the present embodiment, the memory controller 14 continuously writes read data to the buffer 13 also in the period when the card interface unit 11 takes a pause.

Consequently, in the present embodiment, the effective read speed in the processing of reading from the memory card 1 is not lowered.

The camera device 2 as the host apparatus can make read access at the effective read speed limited by the processing of reading to the buffer 13 by the memory controller 14.

As described above, in the present embodiment, in the memory card 1 that performs data transmission/reception with the host apparatus by using the PCI Express I/F, the power consumption during the access period of the host apparatus can be reduced without the lowering of the effective read/write speed of the memory card 1.

Furthermore, in the present embodiment, irrespective of the magnitude of the read/write speed of the non-volatile memory 15, the components can operate adaptively to this speed.

Specifically, if the non-volatile memory 15 whose read/write speed is low is used, the standby period of the PCI Express I/F is adaptively extended.

Furthermore, if the non-volatile memory 15 whose read/write speed is high is used, automatic adjustment is so carried out that the standby period is shortened.

In this manner, in the present embodiment, the power consumption can be reduced adaptively to the read/write speed of the non-volatile memory 15.

The above-described embodiment is an example of preferred embodiments of the present invention. However, the present invention is not limited thereto, but various modifications or changes can be made without departing from the gist of the present invention.

For example, in the above-described embodiment, the card interface unit 11 in the memory card 1 has the component function to communicate with the host apparatus (2) and the power supply management function based on monitoring of the buffer 13.

As another configuration, for example, the communication control function of the card interface unit 11 based on monitoring of the buffer 13 may be provided separately from the card interface unit 11, and the card interface unit 11 may have only the component function to communicate with the host apparatus.

Figure 17:
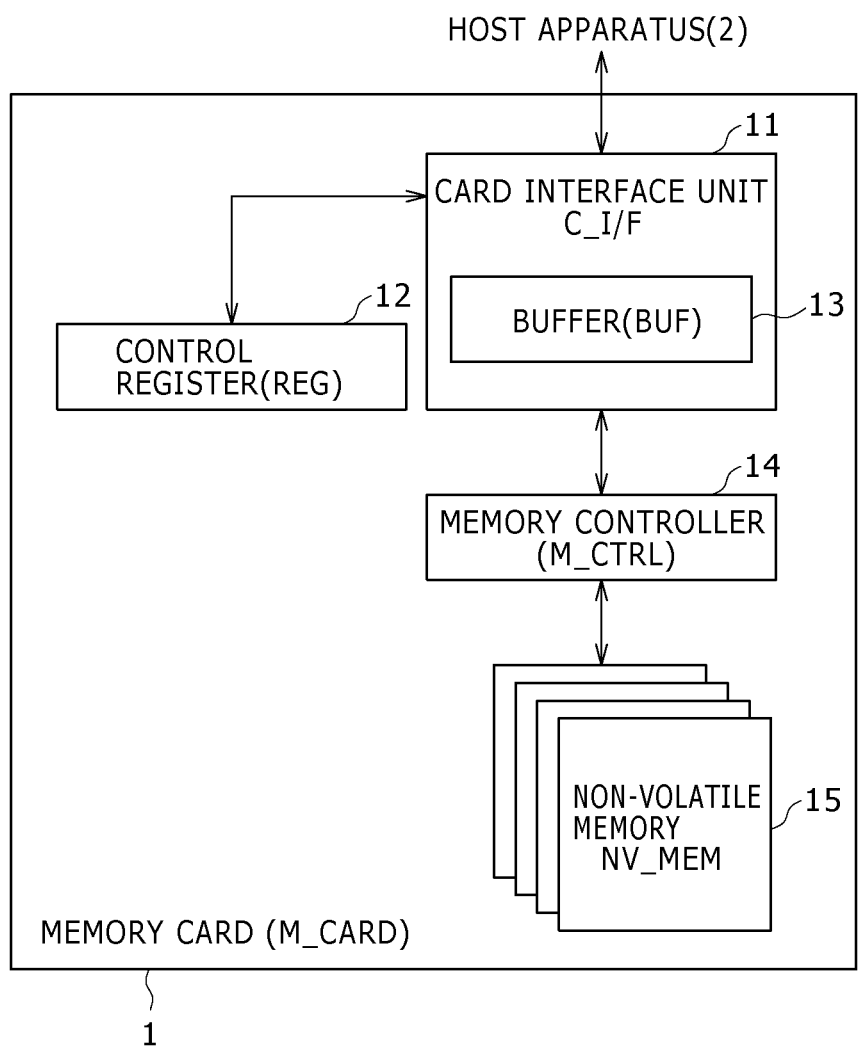
FIG. 17 is a block diagram of the hardware of a memory card according to a first modification example.

As further another configuration, for example, the card interface unit 11 may include the buffer 13 as a built-in unit as shown in FIG. 17.

In the case of FIG. 17, the memory controller 14 is connected to the card interface unit 11 and accesses the buffer 13 in the card interface unit 11.

Figure 18:
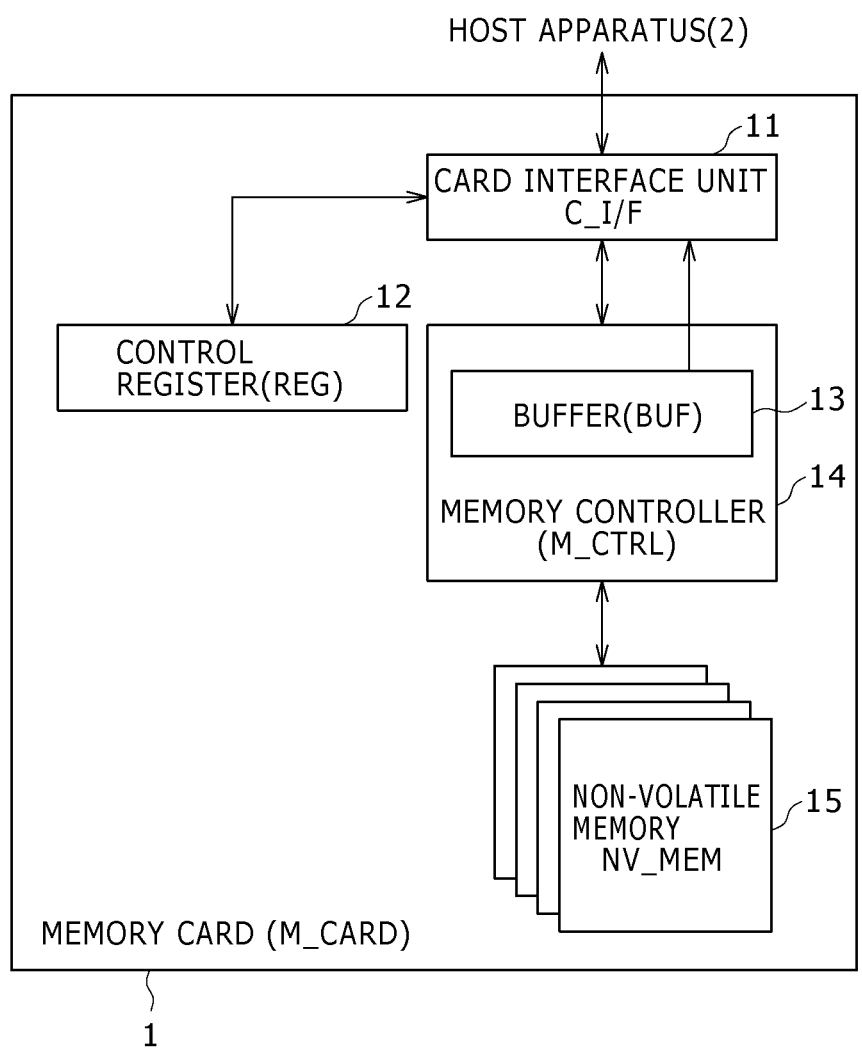
FIG. 18 is a block diagram of the hardware of a memory card according to a second modification example.

Alternatively, as shown in FIG. 18, the buffer 13 as a built-in unit may be included in the memory controller 14.

In the case of FIG. 18, the card interface unit 11 is connected to the memory controller 14 and accesses the buffer 13 in the memory controller 14.

In the above-described embodiment, the memory card 1 has a flash memory as the non-volatile memory 15.

Alternatively, for example, the storage device may have another semiconductor memory such as an EEPROM (Electrically Erasable Programmable Read Only Memory) or a RAM (Random Access Memory), or may have a hard disc drive or the like.

The above-described embodiment is an example of the camera system 3 in which the memory card 1 is utilized by the camera device 2.

As another configuration, for example, the memory card 1 can be utilized by electronic apparatus such as a camcorder device, a sound recording device, a personal computer device, a cellular phone, a PDA (Personal Digital Assistant), and a navigation device.

The above-described embodiment is an example in which PCI Express using a clock signal for communication is utilized for the communication interface between the memory card 1 and the host apparatus.

As another configuration, for example, a USB (Universal Serial Bus) interface, a wireless communication interface, or another interface may be utilized for the communication interface between the memory card 1 and the host apparatus.

The present application contains subject matter related to that disclosed in Japanese Priority Patent Application JP 2010-040460 filed in the Japan Patent Office on Feb. 25, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A storage device comprising:
   a communication execution unit operable to control an operation state between a communication-enabled state in which data communication with an external device is enabled and a pause state in which data communication with the external device is disabled;
   a buffer operable to store data transmitted by and received from the communication execution unit;
   a memory controller operable to carry out data input and output between a memory and the buffer; and
   a communication controller operable to:
   switch the operation state of the communication execution unit from the communication-enabled state to the pause state when an amount of unprocessed write data in the buffer exceeds a predetermined first threshold; and
   switch the operation state of the communication execution unit from the pause state to the communication-enabled state when the amount of the unprocessed write data in the buffer falls below a predetermined second threshold different from the first threshold, wherein the first threshold is set based on a transition latency of the communication execution unit to switch from the communication-enabled state to the pause state during write access.

2. The storage device according to claim 1, wherein the communication execution unit writes, to the buffer, write data received in the communication-enabled state in a period of write access to the storage device, and the communication controller switches the communication execution unit to the pause state when capacity of the buffer is insufficient in the period of the write access, to intermittently set the communication execution unit to the communication-enabled state in the period of the write access.

3. The storage device according to claim 2, wherein the communication controller sets the communication execution unit to the pause state when an amount of unprocessed write data in the buffer that is not processed by the memory controller exceeds the first threshold relative to the capacity of the buffer, to make the communication execution unit pause before the buffer becomes full with the unprocessed write data.

4. The storage device according to claim 3, wherein the communication controller monitors the buffer when the communication execution unit is paused, and the communication controller sets the communication execution unit to the communication-enabled state when the amount of the unprocessed write data in the buffer becomes lesser than the second threshold relative to the capacity of the buffer, to set the communication execution unit to the communication-enabled state before the unprocessed write data in the buffer is exhausted.

5. The storage device according to claim 1, wherein the communication execution unit transmits read data written to the buffer by the memory controller in the communication-enabled state in a period of read access to the storage device, and the communication controller switches the communication execution unit to the pause state when amount of unprocessed read data in the buffer is less than a predetermined read lower-limit threshold in the period of the read access, to intermittently set the communication execution unit to the communication-enabled state in the period of the read access.

6. The storage device according to claim 5, wherein the communication controller sets the communication execution unit to the pause state at beginning of the period of the read access.

7. The storage device according to claim 6, wherein the communication controller monitors the buffer when the communication execution unit is paused, and the communication controller sets the communication execution unit to the communication-enabled state when the amount of the unprocessed read data that are not processed by the memory controller that exist in the buffer exceeds a predetermined read upper-limit threshold relative to capacity of the buffer, to set the communication execution unit to the communication-enabled state before the buffer becomes full with the unprocessed read data.

8. The storage device according to claim 7, wherein when the communication execution unit is set to the communication-enabled state, the communication controller sets the communication execution unit to the pause state when the amount of the unprocessed read data in the buffer becomes lesser than the predetermined read lower-limit threshold relative to the capacity of the buffer, to set the communication execution unit to the pause state before the unprocessed read data in the buffer is exhausted.

9. The storage device according to claim 8, wherein the communication controller determines whether or not the amount of remaining unprocessed read data is equal to or larger than capacity of the buffer equivalent to the read upper-limit threshold, and the communication controller sets the communication execution unit to the pause state when the amount of the remaining unprocessed read data is equal to or larger than the capacity.

10. The storage device according to claim 1, wherein the communication execution unit transmits and receives a serial data signal in the communication-enabled state, and the communication execution unit carries out communication for switching from the communication-enabled state to the pause state, and switches from the communication-enabled state to the pause state when the switching is permitted by the communication.

11. The storage device according to claim 1, wherein power consumed by the storage device during one or both of read access or write access of the external device is reduced.

12. The storage device according to claim 1, wherein power consumed by the storage device during one or both of read access or write access of the external device is reduced adaptively based on one or both of read and write speed of the memory.

13. The storage device of claim 1, wherein the first threshold is set to avoid buffer overflow state due to the transition latency from the communication-enabled state to the pause state.

14. The storage device of claim 1, wherein the first threshold and the second threshold are set relative to a total capacity of the buffer responsive to user input.

15. The storage device of claim 14, wherein the first threshold and the second threshold are set based on the transition from the communication-enabled state to the pause state and the transition from the pause state to the communication-enabled state respectively.

16. The storage device of claim 1, wherein the first threshold and the second threshold enable the memory controller to process the write data in the buffer continuously during one write access.

17. The storage device of claim 1, wherein the second threshold is set based on a return latency of the communication execution unit to switch from the pause state to the communication-enabled state during write access.

18. A storage system comprising:
a storage device removably coupled to an electronic apparatus that executes data processing, the storage device comprising:
a communication execution unit operable to control an operation state between a communication-enabled state in which data communication with the electronic apparatus is enabled and a pause state in which data communication with the external device is disabled;
a buffer operable to store data transmitted and received by the communication execution unit to and from the electronic apparatus;
a memory controller operable to carry out data input and output between a memory and the buffer; and
a communication controller operable to:
switch the operation state of the communication execution unit from the communication-enabled state to the pause state when an amount of unprocessed write data in the buffer exceeds a predetermined first threshold; and
switch the operation state of the communication execution unit from the pause state to the communication-enabled state when the amount of the unprocessed write data in the buffer reaches a predetermined second threshold different from the first threshold, wherein the first threshold is set based on a transition latency of the communication execution unit to switch from the communication-enabled state to the pause state during write access.

* * * * *